United States Patent Office 3,288,761
Patented Nov. 29, 1966

3,288,761
CURABLE MIXTURES OF DIEPOXY COMPOUNDS
AND DICARBOXYLIC ACID ANHYDRIDES
Erwin Nikles, Allschwil, and Hans Batzer, Arlesheim,
Switzerland, assignors to Ciba Limited, Basel, Switzerland, a Swiss company
No Drawing. Filed Mar. 5, 1962, Ser. No. 177,258
Claims priority, application Switzerland, Mar. 7, 1961,
2,726/61; Jan. 17, 1962, 550/62
4 Claims. (Cl. 260—78.4)

U.S. patent specification No. 2,543,419 granted February 27, 1951 to Warren D. Niederhauser, Philadelphia, describes diepoxides of bis-exodihydrodicyclopentadienyl glycol ethers obtained by adding 2 molecular proportions of dicyclopentadiene onto 1 molecular proportion of an unsubstituted glycol, such as ethylene glycol, or a polyalkylene glycol such as diethylene glycol, and subsequent epoxidation. While it is possible to convert said epoxides with dicarboxylic anhydrides at temperatures of about 200° C. into cured castings having good mechanical properties, curing at lower temperatures, such, for example, as 140°, furnishes brittle products that are completely useless for technical purposes. On the other hand, curing temperatures of 200° C. are undesirable for many technical applications. More especially certain insulating materials used in the electrical industry, such as impregnated papers or thermoplasts to be incorporated in the casting resin, cannot withstand such high curing temperatures at all.

It has now surprisingly been found that by using instead of an epoxidised adduct of 2 mols of dicyclophentadiene with 1 mol of a glycol or polyalkylene glycol, an epoxidised adduct of 2 mols of dicyclopentadiene with 1 mol of a triol containing 3 to 9 carbon atoms, castings having outstanding mechanical properties are obtained when the curing with a dicarboxylic acid anhydride is performed at a temperature substantially below 200° C., for example at 140° C.

Accordingly, the present invention provides thermocurable mixtures containing
 (1) a diepoxide of the formula (I)

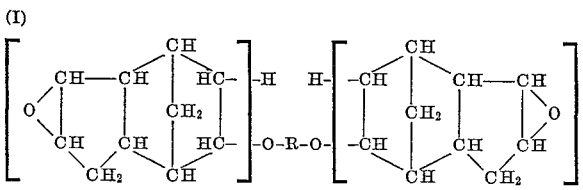

where R represents the residue of an aliphatic, saturated trihydric alcohol or ether alcohol containing 3 to 9 carbon atoms, obtained by elimination of 2 hydroxyl groups, and at least one dicarboxylic acid anhydride.

(2) The invention further provides a process for the manufacture of cured resins, wherein a diepoxide of the Formula I is reacted with at least one dicarboxylic acid anhydride at an elevated temperature.

The diepoxides of the Formula I are readily accessible by first adding 2 mols of dicyclopentadiene onto 1 mol of the trihydric alcohol or ether alcohol, and treating the resulting adduct with an epoxidizing agent.

As aliphatic saturated trihydric alcohols there may be mentioned 1:2:4-butanetriol, 1:2:6-hexanetriol, 1:1:1-trimethylolethane, 1:1:1 - trimethylolpropane, 2:4 - dihydroxy-2-hydroxymethylpentane and more especially glycerol. As aliphatic saturated trihydric ether alcohols there may be mentioned the addutcs of 1 mol of ethylene oxide or propylene oxide with 1 mol of an aliphatic saturated trihydric alcohol such as butanediol, hexanetriol or glycerol.

In general, the additive combination of dicyclopentadiene with the triol is carried out in the presence of an acid catalyst, more especially boron trifluoride, and this reaction produces as a rule mixtures of ether alcohols.

When 2 mols of dicyclopentadiene are added in this manner onto 1 mol of glycerol there is obtained, for example, a mixture of the compound of the formula (II)

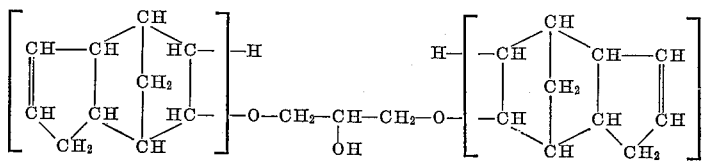

and of the compound of the formula (III)

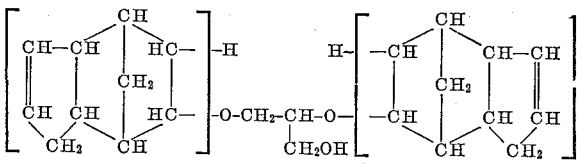

In general, a small amount of monoadduct of 1 mol of dicyclopentadiene with 1 mol of the triol is formed simultaneously as by-product. These adducts can be removed from the reaction mixture before the epoxidation, though it is of advantage to some applications when the mixture is epoxidized as it is, and in such a case, the monoadduct is converted into the corresponding monoepoxide at the same time as the diepoxide is formed.

The epoxidation of the C=C double bonds in the dihydro-dicyclopentadiene rings is carried out by conventional methods, preferably with the aid of an organic per-acid such as peracetic, perbenzoic, peradipic, monoperphthalic acid or the like, or with the use of a mixture of hydrogen peroxide with an organic acid such as formic acid, or with an acid anhydride such as acetic or succinic anhydride. Another suitable epoxidizing agent is hypochlorous acid; when this agent is used, HOCl is added onto the double bond in a first stage, whereupon in a second stage the epoxide group is formed under the action of an agent splitting off hydrogen chloride, for example a strong alkali.

Thus, for example, on epoxidation a mixture of compounds (II) and (III) is converted into a mixture of the diepoxide of the formula (IV)

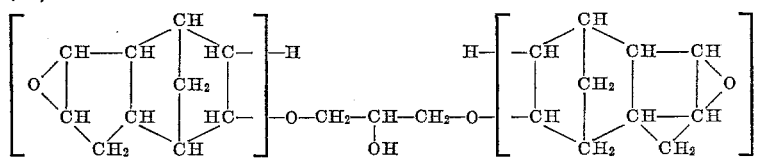

and the diepoxide of the formula (V)

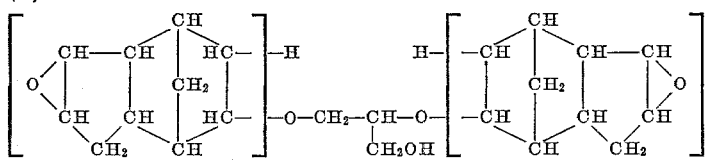

As dicarboxylic acid anhydrides suitable for curing the diepoxides of the Formula I there may be mentioned: The anhydrides of phthalic,
tetrahydrophthalic,
hexahydrophthalic,
endomethylene-tetrahydrophthalic,
methyl-endomethylene-tetrahydrophthalic (=methyl nadic anhydride),
hexachloro-endomethylene-tetrahydrophthalic,
succinic,
adipic,
maleic,
itaconic,
aconitic,
allylsuccinic,
pentenylsuccinic,
hexenylsuccinic,
dodecenylsuccinic,
vinyloxysuccinic,
7-allyl-bicyclo-(2:2:1)-hept-5-ene-2:3-dicarboxylic,
7-octenyl-bicyclo-(2:2:1)-hept-5-ene-2:3-dicarboxylic, and
methyl-7-allyl-bicyclo (2:2:1)-hept-5-ene-2:3-dicarboxylic acid.

If desired, accelerators such as tertiary amines or their salts or quaternary amonium compounds may be used concomitantly, for example tris(dimethylaminomethyl)-phenol, benzyldimethylamine or benzyldimethylammonium phenate or strong Lewis bases, for example alkali metal alcoholates, and with advantage also polyhydroxyl compounds such as hexanetriol, glycerol or 2:4-dihydroxy-2-hydroxymethyl pentane.

It is of advantage to use in the curing process according to the invention for every gram equivalent of epoxide groups 0.5 to 1.1 gram equivalents of anhydride groups.

The curable mixtures of the invention of diepoxides of the Formula I and dicarboxylic anhydrides as curing agent further contain with advantage a proportion of the ether as defined above whose epoxide groups, however, are wholly or partially hydrolysed to hydroxyl groups, and/or other polyhydroxyl compounds having a cross-linking action, such as hexanetriol. In addition to the diepoxide of the Formula I there may be added to the curable mixtures also other epoxides such, for example, as monoglycidyl or polyglycidyl ethers of monoalcohols or polyalcohols such as butanol, 1:4-butanediol or glycerol or of monophenols or polyphenols such as cresol, resorcinol, bis-[4-hydroxyphenyl]-dimethylmethane or condensation products of aldehydes with phenols (novolaks); also polyglycidyl esters of polycarboxylic acids such as phthalic acid; aminopolyepoxides such, for example, as are obtained by dehydrohalogenating a reaction product of an epihalohydrin with a primary or secondary amine such as n-butylamine, aniline or 4:4'-di-[monomethylamino]-diphenylmethane; furthermore cycloaliphatic monoepoxides or polyepoxides such as 3:4-epoxy-tetrahydro-dicyclopentadienol-8, dicyclopentadiene dioxide, vinyl cyclohexene dioxide, 3:4-epoxy-tetrahyro-dicyclopentadienyl-8-glycidyl ether and the epoxidized acetal from $\Delta^3$-tetrahydrobenzaldehyde and cyclohexene-3-dimethanol(1:1).

Furthermore, the mixtures of diepoxide (I) and dicarboxylic acid anhydride according to the invention can be mixed at any stage prior to the curing with fillers, plasticisers, pigments, coloring matter, flame-inhibiting substances, mould release agents and the like. Suitable extenders and fillers are, for example, asphalt, bitumen, glass fibers, mica, quartz meal, cellulose, kaolin, ground dolomite, colloidal silica having a large specific surface (Aerosil) or metal powders such as aluminum powder.

The mixture of diepoxide and curing agent according to the invention may be used without or with a filler, if desired in the form of a solution or emulsion, as laminating resins, paints, lacquers, dipping resins, casting resins, moulding compositions, pore fillers and putties, flooring compositions, coating and insulating compounds for the electrical industry, adhesives and the like, and also for the manufacture of such products.

Parts and percentages in the following examples are by weight and the relationship between part by weight and part by volume is the same as that of the kilogram to the liter:

*Example 1*

A mixture of 184 parts of glycerol and 15 parts of a solution of 48 percent strength of boron trifluoride in ether is heated to 120° C. and 528 parts of dicyclopentadiene (commercial grade) are stirred in dropwise, while cooling slightly to maintain the temperature at 120° C. When the exothermic reaction has subsided, the mixture is kept for another 3 hours at about 120° C. with the aid of a heating bath. The reaction mixture is then allowed to cool and dissolved in 2000 parts by volume of ether. The solution is washed with 200 parts of water and with 2×200 parts by volume of 2 N-sodium carbonate solution, dried over anhydrous sodium sulfate, filtered and evaporated.

The residue is distilled under a high vacuum and yields the following fractions:

| Fraction No. | Boiling range ° C. (0.3 mm. Hg) | Amount (parts) | Hydroxyl number |
|---|---|---|---|
| 1 | 137–163 | 93 | 405 |
| 2 | 163–185 | 38 | 368 |
| 3 | 185–215 | 370 | 163 |
| 4 | 215–238 | 36 | 58 |
| (Residue) | | 140 | 41 |

When Fraction 1 is subjected to another fractionation it yields glycerol-mono-8 (or 9)-[dihydro-exo-dicyclopentadienyl]-ether which boils from 146 to 154° C. under a pressure of about 0.02 mm. Hg and has a hydroxyl number of 494.

When Fraction 3 is subjected to another distillation it yields 268 parts of pure glycerol-bis-8 (or 9)-[dihydro-exo-dicyclopentadienyl]-ether boiling from 200 to 206° C. under 0.07 mm. Hg pressure. Hydroxyl number: 156.

Similar mixtures are obtained by reacting glycerol with dicyclopentadiene in the presence of other acidic catalysts such, for example, as sulfuric acid.

1600 parts of glycerol-bis-8 (or 9)-[dihydro-exo-dicyclopentadienyl]-ether are dissolved in 3500 parts by volume of ethylbenzene and 1440 parts of aqueous peracetic acid of 60% strength are stirred in portionwise at 50° C. After all the peracetic acid has been added the mixture is maintained, first by cooling and then by means of a heating bath, for 3 hours at 50° C. The aqueous phase is separated and extracted with 600 parts by volume of ethylbenzene. The extract is combined with the main solution. The solution as a whole is mixed with 2000 parts by volume of ethylbenzene and then evaporated in a rotary evaporator in a water-jet vacuum on a boiling water bath. The residue is freed from the last remnants of solvent at 100° C. under a pressure of 1–2 mm. Hg, to yield 1739 parts of glycerol-bis-8 (or 9)-[3:4-epoxy-tetrahydro-exo-dicyclopentadienyl]-ether containing 5.00 epoxide equivalents per kg. The product is a highly viscous resin.

Specimens of glycerol-bis-8 (or 9)-[3:4-epoxy-tetrahydro-exo-dicyclopentadienyl]-ether (Resin A) and of the ethylene glycol-bis-8 (or 9)-[3:4-epoxy-tetrahydro-exo-dicyclopentadienyl]-ether (Resin B; prepared according to U.S. specification No. 2,543,419, granted February 27, 1951 to Warren D. Niederhauser, Philadelphia) are fused at 120° C. with phthalic anhydride, using 0.65 and 0.85 mol of anhydride per equivalent of epoxide respectively.

The resulting casting resin mixtures are poured into aluminum moulds (40×10×140 mm.) and each is cured for 24 hours at 140° C. The properties of the cured castings are shown in the following table:

| Resin | Mols of anhydride per equivalent of epoxide | Bending strength, kg./mm.² | Impact bending strength, cm. kg./cm.² | Thermostability according to Martens DIN in ° C. |
|---|---|---|---|---|
| A | 0.65 | 8 | 5 | 156 |
| B | 0.65 | (*) | (*) | (*) |
| A | 0.85 | 6 | 4 | 171 |
| B | 0.85 | (*) | (*) | (*) |

*Casting very brittle, cannot be worked.

Example 2

Glycerol and dicyclopentadiene are reacted as described in Example 1, but the adduct washed with 2 N-sodium carbonate solution is not distilled.

670 parts of the crude reaction product of glycerol with dicyclopentadiene are dissolved in 1000 parts by volume of ethyl acetate, the solution is heated to 50° C. and within about one hour 720 parts of aqueous peracetic acid of 53.2% strength are stirred in dropwise. The mixture is allowed to react for another 3 hours at 50° C. with initial cooling while towards the end of the reaction the batch must be heated. The mixture is diluted with 2500 parts by volume of ethylbenzene and evaporated under a water-jet vacuum. The residue is freed from the last remnants of solvent at 130° C. under a high vacuum. The resulting, highly viscous epoxy resin (725 parts) contains 4.86 epoxide equivalents per kg.

Specimens of the above resin are fused at 120 to 130° C. with phthalic anhydride, using for every equivalent of epoxide 0.65, 0.75 and 0.85 mol of anhydride respectively. The casting resin mixtures are poured at 120 to 130° C. into aluminum moulds (40×10×140 mm.) and each casting is cured for 24 hours at 120° C., then for 24 hours at 140° C. and finally for 24 hours at 200° C.

The properties of the cured castings are shown in the following table:

| Mols of phthalic anhydride per epoxide equivalent | Bending strength, kg./mm.² | Impact bending strength, cm. kg./cm.² | Thermostability according to Martens DIN in ° C. |
|---|---|---|---|
| 0.65 | 5.4 | 3.1 | 215 |
| 0.75 | 9.0 | 5.5 | 214 |
| 0.85 | 6.1 | 4.1 | 211 |

Example 3

184 parts of glycerol are reacted with 528 parts of dicyclopentadiene as described in Example 1. To neutralize the catalyst the product is stirred, without being diluted, with 25 parts of calcined sodium carbonate and 10 parts of water for one hour at 120° C. The mixture is filtered while still hot.

The filtrate is dissolved in 1000 parts by volume of ethyl acetate and 745 parts of aqueous peracetic acid of 51.4% strength are stirred in portionwise at 50° C. The mixture is maintained for 3 hours at 50° C., then mixed with 2500 parts by volume of ethylbenzene and evaporated in a water-jet vacuum. The residue is freed from residual solvent in a high vacuum at 130° C., to yield a highly viscous epoxy resin containing 4.77 epoxy equivalents per kg.

At 120 to 130° C. mixtures of the above epoxy resin and phthalic anhydride are prepared, using per equivalent of epoxide 0.75, 0.85 and 1.0 mol of anhydride respectively. The mixtures of the resin with the curing agent are poured at 120 to 130° C. into aluminum moulds (40×10×140 mm.) and each casting is cured for 24 hours at 120° C. and then for 24 hours at 140° C.

The properties of the cured castings are shown in the following table:

| Mols of phthalic anhydride per epoxide equivalent | Bending strength, kg./mm.² | Impact bending strength, cm. kg./cm.² | Thermostability according to Martens DIN in ° C. |
|---|---|---|---|
| 0.75 | 9.4 | 9.9 | 163 |
| 0.85 | 10.0 | 10.3 | 174 |
| 1.0 | 11.4 | 8.6 | 163 |

55.0 parts of the above epoxy resin are mixed at 90 to 100° C. with 39.8 parts of methyl-endomethylene-tetrahydrophthalic anhydride and the resulting casting resin mixture is cured in aluminum moulds (40×10×140 mm.) for 24 hours at 120° and then for 24 hours at 140° C. Another specimen is additionally cured for 24 hours at 200° C. The cured castings display the following properties:

| Curing temperature in ° C. | Bending strength. kg./mm.² | Impact bending strength, cm. kg./cm.² | Thermostability according to Martens DIN in ° C. |
|---|---|---|---|
| 140 | 7.5 | 4.9 | 125 |
| 200 | 6.8 | 4.1 | 201 |

Mixtures of 122 parts of the epoxy resin described above, 67.2 parts of methyl-endomethylene-tetrahydrophthalic anhydride and 44.8 parts of hexachloro-endomethylene-tetrahydrophthalic anhydride are poured into aluminum moulds (40×10×140 mm.) and cured for 24 hours at 120° C. and then for 24 hours at 140° C. One specimen is additionally cured for another 24 hours at 200° C. The properties of the castings are shown in the following table:

| Curing temperature in ° C. | Bending strength, kg./mm.² | Impact bending strength, cm. kg./cm.² | Thermostability according to Martens DIN in ° C. |
|---|---|---|---|
| 140 | 5.4 | 6.1 | 127 |
| 200 | 5.0 | 5.7 | 199 |

*Example 4*

268 parts of 1:1:1-trimethylolpropane are fused and mixed with 20 parts of a solution of 48% strength of boron trifluoride in ether. The mixture is heated to 120° C. and in the course of one hour 528 parts of dicyclopentadiene are stirred in dropwise, while maintaining the temperature at 120° by slight cooling. The mixture is then heated for another 2 hours at 120° C., then cooled and diluted with ether. The solution is washed with 2×250 parts by volume of 2 N-sodium carbonate solution and 100 parts by volume of molar monosodium phosphate solution, dried over anhydrous sodium sulfate, filtered and evaporated. The residue is distilled under a high vacuum. 338 parts of the product (hydroxyl number: 168) pass over between 192 and 226° C. under a pressure of 0.02 mm. Hg.

When the product is once more distilled, the pure 1:1:1-trimethylolpropane-bis-[dihydro - exo - dicyclopentadienyl]-ether passes over between 199 and 201° C. under a pressure of 0.01 mm. Hg.

*Analysis.*—$C_{26}H_{38}O_3$: Calculated: C, 78.35; H, 9.61%. Found: C, 78.58; H, 9.68%.

A solution of 333 parts of 1:1:1-trimethylolpropane-bis-[dihydro-exo-dicyclopentadienyl]-ether in 700 parts of ethylbenzene is heated to 50° C. and in the course of 30 minutes 340 parts of aqueous peracetic acid of 48.4% strength are added dropwise. The mixture is cooled to maintain it at a temperature of about 50° C., and then allowed to react for another 2 hours at 50° C. The aqueous phase is separated and extracted with 2×500 parts by volume of ethylbenzene. The extracts are combined with the main solution. The solution of the product is evaporated in a rotary evaporator in a water-jet vacuum on a boiling water bath. The last remanents of solvent are removed at 120° C. in a high vacuum. Yield: 357 parts of a highly viscous epoxy resin containing 4.49 epoxide equivalents per kg.

124 parts of the resulting epoxy resin are fused at about 120° C. with 61.4 parts of phthalic anhydride and poured into aluminum moulds (40×10×140 mm.) [Specimens A and B]. In exactly the same manner casting resin mixtures are prepared from 124 parts of epoxy resin, 41 parts of tetrahydrophthalic anhydride and 22 parts of phthalic anhydride [Specimens C and D]. Each casting resin mixture is cured for 24 hours at 120° C. and then for 24 hours at 140° C. Specimens B and D are additionally cured for another 24 hours at 200° C.

The properties of the cured castings are shown in the following table:

| Specimen | Bending strength, kg./mm.² | Impact bending strength, cm. kg./cm.² | Thermostability according to Martens DIN in ° C. |
|---|---|---|---|
| A | 6.2 | 3.5 | 158 |
| B | 6.3 | 4.4 | 204 |
| C | 6.2 | 8.8 | 140 |
| D | 7.8 | 7.7 | 173 |

*Example 5*

A mixture of 530 parts of 1:2:4-butanetriol and 40 parts of an ethereal solution of 48% strength of boron trifluoride is heated to 120° C. and at this temperature 1320 parts of dicyclopentadiene are stirred in dropwise within 90 minutes. The mixture is then allowed to react for another hour at 120° C., then cooled, diluted with 4000 parts by volume of ether and washed with 2 N-sodium carbonate solution until it is free from acid. The solution is treated with 100 parts by volume of molar monosodium phosphate solution, dried over anhydrous sodium sulfate, filtered and evaporated. The residue is distilled, first in a water-jet vacuum and then in a high vacuum. Between 150 and 240° C. under a pressure of 0.5 mm. Hg 347 parts of product (hydroxyl number: 129) pass over. When the fractionation is repeated, pure 1:2:4 - butanetriol-bis-[dihydro-exo-dicyclopentadienyl]-ether passes over between 207 and 211° C. under 0.4 mm. Hg pressure.

*Analysis.*—$C_{24}H_{24}O_3$: Calculated: C, 77.80; H, 9.25%. Found: C, 77.88; H, 9.19%.

120 parts of 1:2:4-butanetriol-bis-[dihydro-exo-dicyclopentadienyl]-ether are dissolved in 250 parts of ethylbenzene and at 50° C. 136 parts of aqueous peracetic acid of 48.4% strength are stirred in dropwise, whereupon the mixture is stirred for 2 hours at 50° C. The aqueous phase is then separated and extracted with 2×250 parts by volume of ethylbenzene. The combined solutions are evaporated in a water-jet vacuum, to yield 129 parts of a highly viscous diepoxide containing 4.71 epoxide equivalents per kg.

121 parts of the resulting epoxy resin are mixed at 120° C. with 63 parts of phthalic anhydride. The casting resin mixture is poured into aluminum moulds (40×10×140 mm.) and cured for 24 hours at 120° C. and then for 24 hours at 140° C. (specimen A). Another specimen (B) is additionally cured for another 24 hours at 200° C. The properties of the cured castings are shown in the following table:

| Specimen | Bending strength, kg./mm.² | Impact bending strength, cm. kg./cm.² | Thermostability according to Martens DIN in ° C. |
|---|---|---|---|
| A | 6.4 | 3.5 | 158 |
| B | 4.8 | 3.1 | 201 |

*Example 6*

The procedure is as described in Example 4, except that instead of 1:1:1-trimethylolpropane an equal amount of 1:2:6-hexanetriol and 25 parts of an ethereal solution of 48% strength of boron trifluoride are used.

On distillation 194 parts of product (hydroxyl number: 153) pass over between 190 and 220° C. under a pressure of 0.001 mm. Hg. When this product is once more distilled it yields pure 1:2:6-hexanetriol-bis-[dihydro-exo-dicyclopentadienyl]-ether boiling at 210° C. under a pressure of 0.008 mm. Hg.

*Analysis.*—$C_{26}H_{38}O_3$: Calculated: C, 78.35; H, 9.61%. Found: C, 78.44; H, 9.44%.

Epoxidation furnishes substantially pure 1:2:6-hexanetriol-bis-[3:4 - epoxy-tetrahydro-dicyclopentadienyl]-ether in the form of a highly viscous resin containing 4.60 epoxide equivalents per kg.

124 parts of 1:2:6-hexanetriol-bis-[3:4-epoxy-tetrahydro-dicyclopentadienyl]-ether are fused at about 120° C. with 63.2 parts of phthalic anhydride. The casting resin mixture is poured into aluminum moulds (40×10×140 mm). Specimen A is cured for 24 hours at 120° and then for 24 hours at 140° C., and Specimen B is additionally cured for another 24 hours at 200° C. The properties of the cured castings are shown in the following table:

| Specimen | Bending strength, kg./mm.² | Impact bending strength, cm. kg./cm.² | Thermostability according to Martens DIN in °C. |
|---|---|---|---|
| A | 7.8 | 5.4 | 151 |
| B | 6.7 | 8.5 | 186 |

70 parts of 1:2:6-hexanetriol-bis-[3:4-epoxy-tetrahydro-dicyclopentadienyl]-ether are mixed at 130° C. with 24.2 parts of succinic anhydride. The casting resin mixture is poured into an aluminum mould (40×10×140 mm.) and cured for 24 hours at 120° C. and then for 24 hours at 140° C. The cured casting displays the following properties:

Bending strength, kg./mm.² _____ 12.8
Impact bending strength, cm. kg./cm.² _____ 16.3

*Example 7*

Ethylene oxide is injected at 165° to 170° C. into 184 parts of glycerol containing 0.5 part of potassium hydroxide until 89 parts of ethylene oxide have been absorbed.

266 parts of the resulting reaction product are mixed with 16 parts of an ethereal solution of 48% strength of boron trifluoride and the whole is heated to 120° C. While continuously stirring the mixture at 120° C., 576 parts of dicyclopentadiene are dropped into the mixture. After a total reaction time of 3 hours at 120 C. the reaction product is cooled, diluted with 1800 parts by volume of ether and washed with 350 parts of volume of 2 N-sodium carbonate solution and 100 parts by volume of molar mono-sodium phosphate solution. The solution is dried over anhydrous sodium sulfate, filtered and evaporated.

The residue is dissolved in 1300 parts of ethylbenzene and the solution is mixed at 50° C. portionwise with 680 parts of aqueous peracetic acid of 50.3% strength, whereupon the temperature is maintained for 90 minutes longer at 50° C. The aqueous phase is separated and extracted wtih 500 parts by volume of ethylbenzene. The extract is combined wtih the main solution and evaporated. The residue is dried at 120° C. in a high vacuum, to yield a viscous epoxy resin containing 4.35 epoxide equivalents per kg. 100 parts of this epoxy resin are fused at 50° C. wtih 43 parts of maleic anhydride to form a thinly liquid mixture. A specimen of the product heated at 120° C. gels after 2 hours and undergoes curing to form an insoluble, hard substance.

What is claimed is:
1. Thermocurable mixtures consisting essentially of (1) diepoxide of the formula

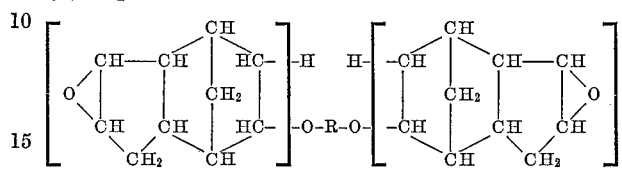

where R is the divalent radical which is obtained by elimination of two hydroxyl groups from a compound selected from the class consisting of aliphatic saturated trihydric alcohols containing 3 to 9 carbon atoms and aliphatic saturated trihydric ether alcohols containing 3 to 9 carbon atoms, and (2) a dicarboxylic acid anhydride, said mixtures being curable at a temperature of about 140° C.

2. Mixtures as claimed in claim 1, containing as diepoxide the compound of the formula

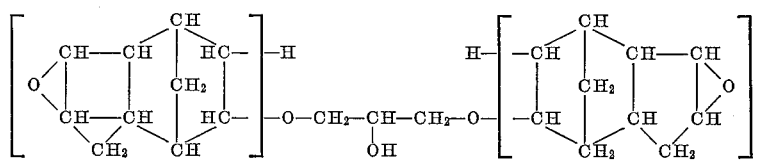

3. Mixtures as claimed in claim 1, containing as diepoxide the compound of the formula

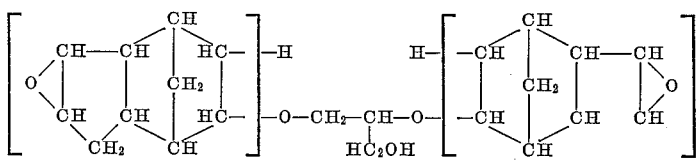

4. Mixtures as claimed in claim 1, containing 0.5 to 1.1 gram equivalents of anhydride groups for every gram equivalent of epoxide groups.

References Cited by the Examiner

UNITED STATES PATENTS 2,324,483  7/1943  Castan _____ 260—47
2,623,023  12/1952  Koroly _____ 260—78.4

OTHER REFERENCES

Lee et al.: "Epoxy Resins," pages 48 and 49 relied on, McGraw-Hill Book Co., Inc., New York, July 1957.

WILLIAM H. SHORT, *Primary Examiner.*

JOSEPH R. LIBERMAN, *Examiner.*

T. D. KERWIN, *Assistant Examiner.*

UNITED STATES PATENT OFFICE
CERTIFICATE OF CORRECTION

Patent No. 3,288,761                          November 29, 1966

Erwin Nikles et al.

It is hereby certified that error appears in the above numbered patent requiring correction and that the said Letters Patent should read as corrected below.

Column 10, lines 30 to 35, the extreme left-hand portion of the formula should appear as shown below instead of as in the patent:

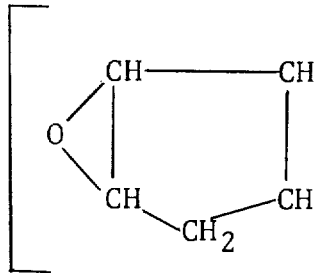

column 10, lines 40 to 45, the extreme right-hand portion of the formula should appear as shown below instead of as in the patent:

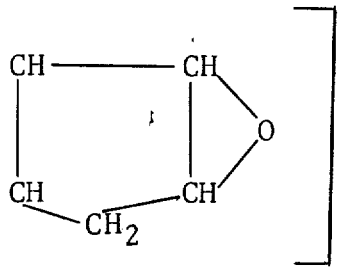

Signed and sealed this 12th day of September 1967.

(SEAL)
Attest:

ERNEST W. SWIDER                          EDWARD J. BRENNER
Attesting Officer                       Commissioner of Patents